United States Patent
Lomax et al.

(10) Patent No.: US 6,887,301 B2
(45) Date of Patent: May 3, 2005

(54) FLOW CONTROL IN PRESSURE SWING ADSORPTION SYSTEMS

(75) Inventors: Franklin D. Lomax, Arlington, VA (US); John S. Lettow, Washington, DC (US); Michael Sean Streeks, Alexandria, VA (US); Vinay Prasad, Alexandria, VA (US)

(73) Assignee: H2GEN Innovations, Inc., Alexandria, VA (US)

( * ) Notice: Subject to any disclaimer, the term of this patent is extended or adjusted under 35 U.S.C. 154(b) by 22 days.

(21) Appl. No.: 10/453,601

(22) Filed: Jun. 4, 2003

(65) Prior Publication Data

US 2004/0244584 A1 Dec. 9, 2004

(51) Int. Cl.$^7$ ................................................ B01D 53/04
(52) U.S. Cl. ............................... 95/96; 96/113; 96/116; 96/130; 96/143
(58) Field of Search ....................... 95/96–98, 100–105; 96/113–116, 130, 143, 144

(56) References Cited

U.S. PATENT DOCUMENTS

| | | | | |
|---|---|---|---|---|
| 4,160,651 A | * | 7/1979 | Pivard | 95/97 |
| 4,348,213 A | * | 9/1982 | Armond | 95/103 |
| 4,576,614 A | * | 3/1986 | Armond et al. | 95/23 |
| 5,122,164 A | * | 6/1992 | Hirooka et al. | 95/26 |
| 5,223,004 A | * | 6/1993 | Eteve et al. | 95/98 |
| 5,340,381 A | * | 8/1994 | Vorih | 95/21 |
| 5,474,595 A | * | 12/1995 | McCombs | 95/23 |
| 5,704,964 A | * | 1/1998 | Kaneko et al. | 95/23 |
| 5,730,778 A | * | 3/1998 | Hill et al. | 95/12 |
| 6,315,818 B1 | * | 11/2001 | Monereau | 95/98 |
| 6,342,090 B1 | * | 1/2002 | Cao | 95/23 |
| 6,699,307 B1 | * | 3/2004 | Lomax, Jr. | 95/97 |
| 2002/0029691 A1 | * | 3/2002 | McCombs et al. | 95/96 |
| 2003/0188635 A1 | * | 10/2003 | Lomax et al. | 95/96 |

* cited by examiner

*Primary Examiner*—Robert H. Spitzer
(74) *Attorney, Agent, or Firm*—Oblon, Spivak, McClelland, Maier & Neustadt, P.C.

(57) ABSTRACT

A method for reducing shock during a flow of fluid between a higher pressure vessel and a lower pressure vessel. The method includes the steps of providing a conduit between the higher pressure vessel and the lower pressure vessel, and minimizing a rate of pressure change within the second vessel caused by the flow of fluid along the conduit from the higher pressure vessel. The minimizing step includes controlling a rate of flow of fluid between the first vessel and the second vessel over a predetermined duration.

44 Claims, 4 Drawing Sheets

FLOW CONTROL IN PRESSURE SWING ADSORPTION SYSTEMS

BACKGROUND OF THE INVENTION

1. Field of the Invention

The present invention is generally related to fluid treatment systems and, more particularly, to flow control in a pressure swing adsorption system.

2. Discussion of the Background

Pressure swing adsorption (PSA) is a commonly used process for the purification of gases. Among other applications, PSA is used to separate oxygen and nitrogen from air, to separate pure helium from natural gas, and to purify hydrogen from 'reformate' gas mixtures. The most efficient PSA processes utilize multiple vessels (also referred to as beds) that interact through numerous stages to yield product continuously and at high pressure.

A typical PSA cycle includes a production step in which gas flows into the vessel at high pressure and certain species of the gas are adsorbed while the product species passes through the column. After the production step, pressure equalization steps are used to transfer product gas present in the void space of a high-pressure vessel to other vessels in the system. These pressure equalization steps preserve pressure energy in the system and improve product recovery. The product gas in one vessel may also be used to purge another vessel. Pure product from the vessel providing purge gas sweeps through the vessel being purged at low pressure and, in the process, desorbs and removes the contaminant gases that had been adsorbed during the production step, thus cleaning the vessel. After the vessel has provided purge gas to clean another vessel, it goes through a 'blowdown' step in which the pressure in the vessel is rapidly reduced in order to desorb some of the contaminant gases. The vessel is then purged and repressurized with gases from other vessels. The adsorbent bed has then completed its pressure swing cycle and is ready to begin producing gas again. Numerous pressure swing cycles have been devised using two or more adsorbent beds, and all of them use some variants of the steps described above.

In all of the steps of the PSA cycle, it is important to control the flow rate of gases into and out of the vessels and to provide good flow distribution within each vessel. Control of the flow rate in the vessels is required to balance adsorption and diffusion kinetics with production rate and to prevent fluidization of adsorbent particles and pressure shocks within the vessels. In addition, one of the most important flow-related factors in all PSA processes is the purge-to-feed ratio. This ratio is typically defined as the actual volume of purge gas used versus the actual volume of feed gas. The purge-to-feed ratio affects both product purity and product recovery, as higher purge-to-feed ratios indicate that more gas is being used to clean out the bed and therefore product purity is increased at the cost of product recovery.

One way to increase the purge-to-feed ratio and maintain product recovery is to reduce the pressure in the vessel being purged. Reducing pressure decreases the equilibrium surface concentrations of contaminants and provides more volume exchanges in the purged vessel for the same number of moles of purge gas. Therefore, it is advantageous to maintain a low pressure in the purging vessel in order to obtain good product purities with high recoveries. Since the vessel providing purge gas is at high pressure, if no measures are taken to control the flow from this vessel into the vessel being purged, the purge step will have a high initial pressure and therefore reduced effectiveness.

Some PSA systems employ proportional valves, pressure regulating valves, or manually adjustable valves to throttle flow between the vessel providing purge gas and the vessel being purged. Thus, the gas is reduced in pressure before it enters the vessel being purged. Adjustable valves add extra expense to PSA systems and they require extensive tuning to optimize performance. The tuning of adjustable valves is especially difficult and time consuming for low molecular weight product gases, such as hydrogen, since small changes in valve lift lead to large changes in flow rate.

In the absence of the pressure-reducing valves used in some PSA systems, the gas in the vessel providing purge gas rapidly flows into the vessel being purged, usually expanding through one or more fluid shocks and eventually being throttled by the vessel plumbing. This can disadvantageously cause the pressures in the two vessels to equilibrate, thereby causing two separate undesirable phenomena. First, the resulting high pressure in the vessel being purged limits the thermodynamically-feasible extent of desorption of the adsorbed impurities, thus reducing the amount of desorption achieved per mole of purge gas. Second, the rapid decrease in pressure in the vessel providing the purge gas causes a particularly undesirable sudden desorption of adsorbed impurities, which are inevitably carried into the vessel being purged. These impurities then are adsorbed near the critical product outlet end of the vessel being purged and are subject to release during the subsequent production steps, thus significantly reducing product purity.

Therefore, it is undesirable to allow the vessel providing purge gas to rapidly discharge its contents into the vessel being purged. It is likewise undesirable to use the pressure regulating valves described in some PSA systems, as they add complexity to the system. Throttling valves, though less complex than the pressure regulating valves, are also undesirable because they require a fine degree of tuning for each PSA system. This tuning is disadvantageous for PSA systems which are serially-produced, because the process requires time-consuming testing and calibration. These problems are compounded especially for hydrogen-purification PSA systems, as hydrogen has an extremely low viscosity and a very high sonic velocity. These systems require very small orifice sizes to achieve flow throttling relative to other gases. Such small orifices are subject to clogging by adsorbent fines as well as throat erosion and subsequent drift in adjustment. These problems are especially critical in PSA systems processing less than one ton per day of hydrogen, as the nozzle sizes required for throttling become smaller than a single adsorbent particle, and may even be so small as to be unfabricable by ordinary techniques.

Another disadvantage of such throttling devices employing flow through an orifice is that the quantity of flow delivered varies radically from the beginning of the purge step to its end. This is due to the nature of flow through orifices, in that the limiting velocity is proportional to the square of the pressure differential. Thus, the flow rate drops dramatically between the beginning of the time step when the pressure in the vessel providing purge is high and the end of the time step when the pressure is much lower. This rapid change in flow rate can cause both the disadvantageous pressure rise in the vessel being purged and the desorption of impurities in the vessel providing purge. Further, if the desorption kinetics are relatively slow, it can reduce the efficacy of the purge step in removing adsorbed impurity species from the vessel being purged, as much of the purge gas moves through the vessel in the very early part of the purge step.

These challenges are compounded when especially compact PSA systems are desired, due to the complex fluid manifolding required to connect the throttling or pressure regulating valves. Such manifolding disadvantageously increases the manufacturing and assembly time required to produce the PSA system.

BRIEF SUMMARY OF THE INVENTION

Accordingly, the present invention advantageously provides an inexpensive and efficient method of controlling gas flow in a fluid treatment assembly, such as a PSA system.

In accordance with a first aspect of the present invention, a method for reducing shock during a flow of fluid between a first vessel and a second vessel is provided. The method includes providing a conduit between the first vessel and the second vessel, and minimizing a rate of pressure change within the second vessel caused by the flow of fluid along the conduit from the first vessel. The minimizing step also includes controlling a rate of flow of fluid between the first vessel and the second vessel over a predetermined duration.

In accordance with another aspect of the present invention, a method for controlling a flow of a gas is provided. The method includes directing the gas from a first vessel to a second vessel, and obtaining a predetermined flow rate profile in the flow between the first and second vessels, where the obtaining step includes introducing a first pulse into the flow by opening and closing a first valve in an alternating manner.

In accordance with a further aspect of the present invention, a method for controlling a flow of a gas is provided. The method includes directing the gas from a first vessel to a second vessel, and obtaining a predetermined flow rate profile in the flow between the first and second vessels, where the obtaining step includes providing a flow restrictor in the flow between the first and second vessels, the flow restrictor exhibiting a linear relationship between flow rate and pressure differential.

In accordance with a further aspect of the present invention, a gas treatment assembly is provided. The assembly includes first and second vessels each including gas treatment material, a manifold connecting the first and second vessels to provide communication of a gas between the first and second vessels, and a first manifold assembly provided between the first vessel and the manifold. The manifold assembly includes a first piston valve, and a first porous flow restrictor.

In accordance with a further aspect of the present invention, a gas treatment assembly is provided. The assembly includes first and second vessels, a manifold connecting the first and second vessels to provide communication of a gas between the first and second vessels, and first means for minimizing a rate of pressure change within the second vessel caused by a gas flow along the manifold from the first vessel. The first minimizing means controls a rate of gas flow between the first vessel and the second vessel over a predetermined duration.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
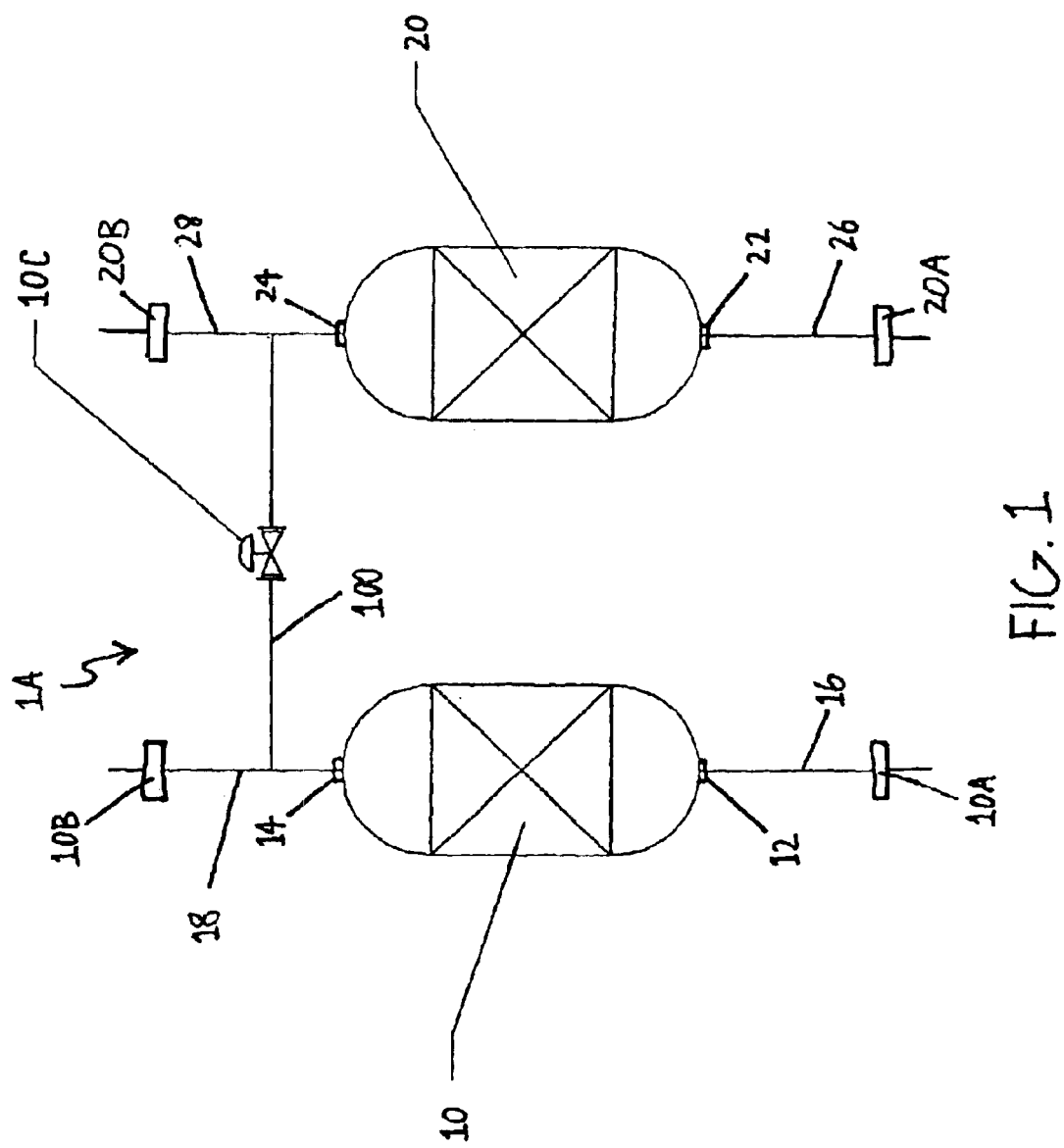
FIG. 1 is a schematic view of a treatment assembly in accordance with an exemplary embodiment of the present invention.

Referring now to the drawings, where like reference numeral designations identify the same or corresponding parts throughout the several views, several embodiments of the present invention are next described.

FIG. 1 shows vessels 10 and 20, which are part of a treatment assembly 1A. Each of vessels 10 and 20 can include fluid treatment material, such as adsorption material, for example. In this disclosure, treatment assembly 1A is described to be used in a PSA process; however, treatment assembly 1A can alternatively be used in a variety of fluid treatment applications. For example, treatment assembly 1A can be used to treat fluids in gas form or in liquid form, depending on the functions of the fluid-treating components included in treatment assembly 1A. Moreover, treatment assembly 1A can be used in a wide range of operating conditions, such as in the conditioning of high-pressure gas, for example.

Vessel 10 includes ports 12 and 14, and vessel 20 includes ports 22 and 24. Ports 12 and 14 are respectively connected to valves 10A and 10B via conduits 16 and 18. Ports 22 and 24 are respectively connected to valves 20A and 20B via conduits 26 and 28. Valves 10A and 20A can be connected to a source manifold or a waste manifold, and valves 10B and 20B can be connected to a product manifold. Vessels 10 and 20 are connected together by a manifold 100 provided with a valve 10C, which acts as a flow control component. During a PSA cycle step, when valve 10C is in the open state, fluid may flow between vessels 10 and 20. When valve 10C is in the closed state, no flow is possible through manifold 100 between vessel 10 and vessel 20.

Figure 4:
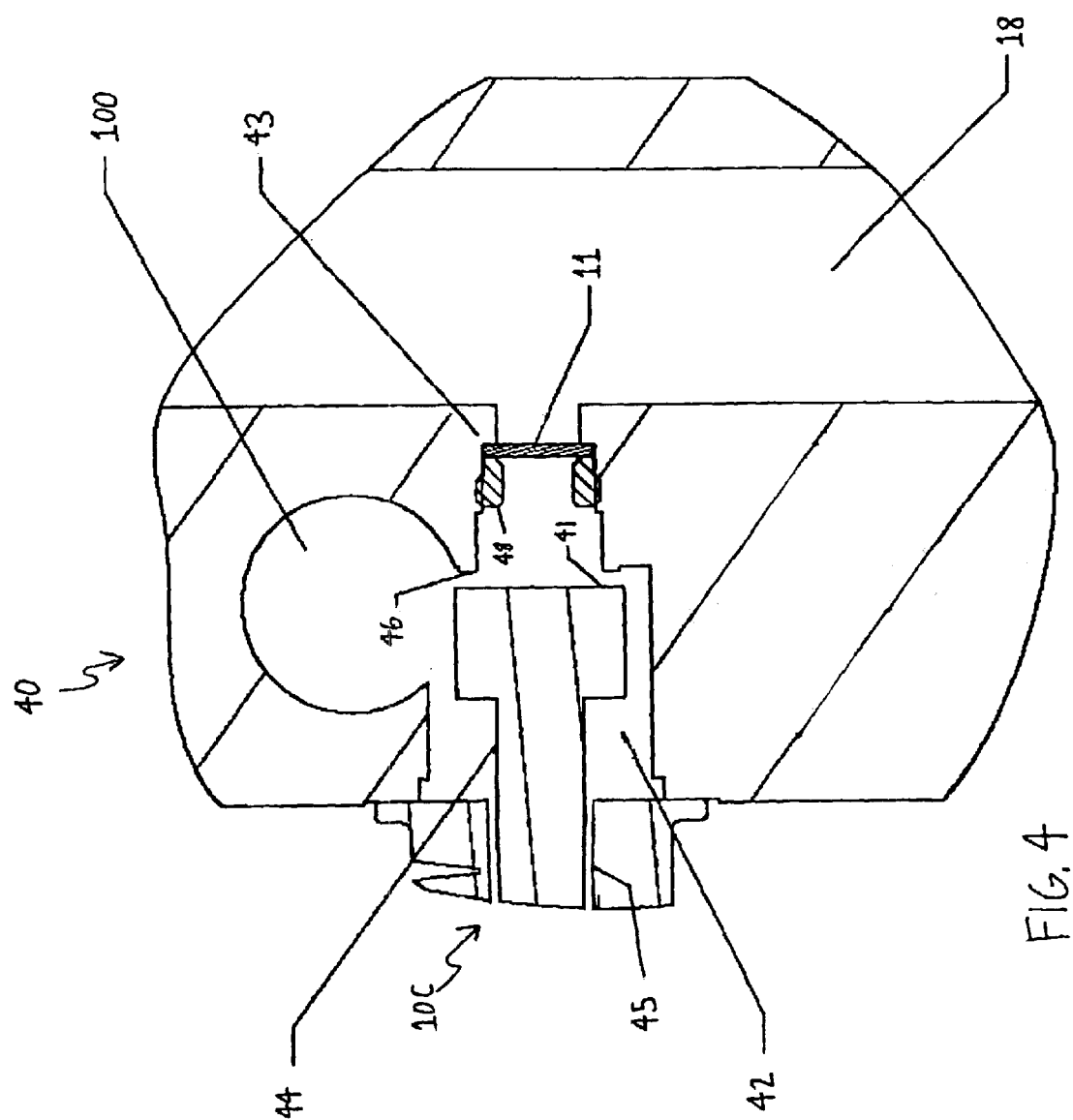
FIG. 4 is a section view of a manifold assembly of FIG. 3.

Valve 10C can be arranged as a piston valve, as shown in FIG. 4. Alternatively, valve 10C can be arranged as any other component known in the art that can be accurately controlled to produce pulsing in a flow of a gas of relatively low viscosity and high sonic velocity (e.g., hydrogen). Valve 10C can be actuated pneumatically or by a solenoid, or by any other means known in the art for actuating a valve in a pulsing manner.

During a PSA cycle, vessel 10 begins a step of providing purge gas at a first elevated pressure, at which time vessel 20 is at a second, lower pressure. Valve 10C is initially closed. During a purging step where vessel 10 provides purge gas to vessel 20, no flow is permitted into vessel 10 through valve 10A, and no flow is allowed through valve 10B. No flow is allowed into vessel 20 through valve 20B, but the purge gas is rejected through valve 20A. When valve 10C is opened during a purge step, the gas flows from vessel 10 through valve 10C into vessel 20 and out of valve 20A, where it is disposed of. The flow rate of this gas will be governed by the fluid friction in this flow path, and is generally extremely high at the initial conditions and is thereafter greatly reduced as the pressure in the vessel 10 is decreased.

The fluid friction exiting vessel 20 generally will create an elevated pressure in vessel 20 that is intermediate between its initial pressure and the initial pressure of vessel 10. If the flow exiting the vessel approaches critical conditions, i.e. sonic velocity, then the pressure rise will be quite dramatic, and vessels 10 and 20 may actually reach an essentially-identical intermediate pressure.

In one aspect of the present invention, valve 10C is alternately opened and closed to admit pulses of fluid flow from vessel 10 into vessel 20 during the purging step. The frequency and duration of the pulses may be varied to deliver either an essentially constant flow rate during the purge period of the PSA cycle, or any other flow rate profile, such as a chronologically-increasing flow rate or a decreasing flow rate. The actuating of valve 10C can be controlled by a computer processing unit that performs a program for operating valve 10C such that a predetermined actuation pattern is achieved.

The above method of flow control offers a number of important advantages. First, the frequency and duration of pulses may be advantageously selected so that the average pressure inside vessel 20 is maintained at a minimum level. Second, the extent of purge provided may be made independent of the overall amount of time dedicated to the purge step. Thus, if a PSA cycle requires a fairly lengthy purge step, but only a small amount of purge gas is transferred between the two vessels during the purge step, then the duration of the transfer of gas can be advantageously controlled. For example, the entire time period allotted for the step of directing purge gas from one vessel to another can be used to perform the gas transfer by controlling valve 10C. For purposes of this document, "entire time period . . . can be used" refers to a condition where the performance of a fluid treatment step takes up the entire time period allocated for the step, with minimal ramp-up and ramp-down times, as recognized in the art.

Finally, the first embodiment of the present invention requires no additional equipment in the PSA apparatus, advantageously reducing the size, weight, complexity, and manufacturing cost of the apparatus.

Figure 2:
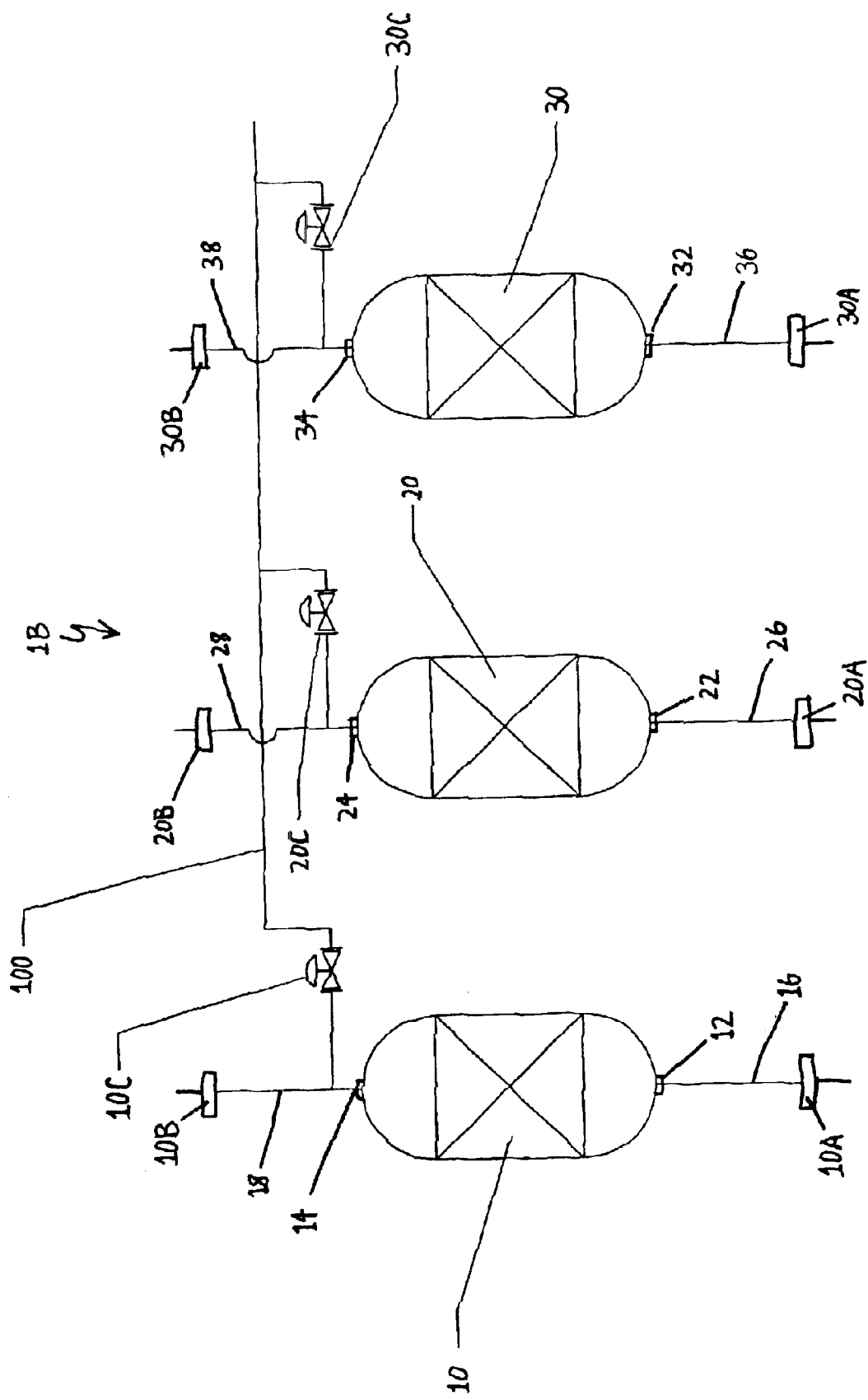
FIG. 2 is a schematic view of a treatment assembly in accordance with a further embodiment of the present invention.

FIG. 2 shows vessels 10, 20, and 30, which are part of a treatment assembly 1B and are in communication through a fluid manifold 100. As a non-limiting example, fluid manifold 100 can be arranged as the parallel fluid manifold described in U.S. patent application Ser. No. 10/269,064, issued as U.S. Pat. No. 6,699,307, which is hereby incorporated by reference in its entirety. Vessels 10, 20, and 30 are respectively provided with valves 10C, 20C, and 30C, each of which control flow between fluid manifold 100 and a corresponding vessel. Valves 10C, 20C, and 30C are arranged in the same manner as valve 10C from the embodiment in FIG. 1. Vessel 30 includes ports 32 and 34, which are respectively connected to valves 30A and 30B via conduits 36 and 38.

During a PSA cycle, when a purge step is initiated where vessel 10 provides purge gas to vessel 20 (as in FIG. 1), valve 30C connecting vessel 30 to manifold 100 is normally in the closed condition. The flow conditions at valves 10A, 10B, 20A, and 20B are as described previously. During the purge step, both valve 10C and valve 20C can be opened completely. However, such a condition results in the problems discussed in the background of the invention.

The same methodology of pulsing valves 10C and 20C may be employed to control the flow of purge gas from vessel 10 to vessel 20 as was employed in the system of FIG. 1. The opening and closing of valves 10C and 20C may be either synchronized or asynchronous, with the advantage of asynchronous opening being that the volume of fluid manifold 100 can be used to buffer pressure pulses otherwise experienced using the valve pulsing method of the present invention.

Thus, the magnitude of the pressure pulses may be minimized by alternately charging the volume of manifold 100 with purge gas from vessel 10 and then discharging said gas into vessel 20. In one example, valves 20C and 30C are closed while purge gas from vessel 10 is directed into manifold 100 from valve 10C. When a total desired amount of gas is transferred from vessel 10 to manifold 100, valve 10C is closed. To then direct the purge gas to vessel 20, valve 20C is then opened and closed in an alternating manner to provide a pulsed, metered flow of the gas into vessel 20, as described with respect to the operation of valve 10C in FIG. 1. In another example, valves 10C and 20C are continuously and simultaneously opened and closed in an alternating manner (i.e., in phase) to allow a pulsed, metered flow of purge gas from vessel 10 to vessel 20 during a purging step. Valves 10C and 20C can also be operated continuously out-of-phase in a purging step, such that valve 10C is open when valve 20C is closed, and vice versa. Further, valve 10C or valve 20C can be maintained in a continuously open position, while the other valve is operated as described with reference to FIG. 1.

Variations in pressure change may be obtained by slightly overlapping the valve opening times, such that an essentially constant rate of pressure decay may be achieved.

A particular advantage of the flow control method of the present invention is that during a given step in a PSA cycle, fluid may be metered through a manifold from one or more vessels at a first highest pressure to one or more vessels at one or more lower pressures. The flow rate and proportion of flow transmitted between each vessel may be varied by altering the duration and frequency of the pulses of the control valves. Whereas known PSA cycles have been designed under the assumption that flow is delivered between distinct vessels during pressure equalizations and purge steps, the use of the flow control method of the present invention allows more complex flow distributions to be executed. This may advantageously be used to fractionate complex mixtures, or to tailor the purity of gases transmitted between vessels during a cycle.

Figure 3:
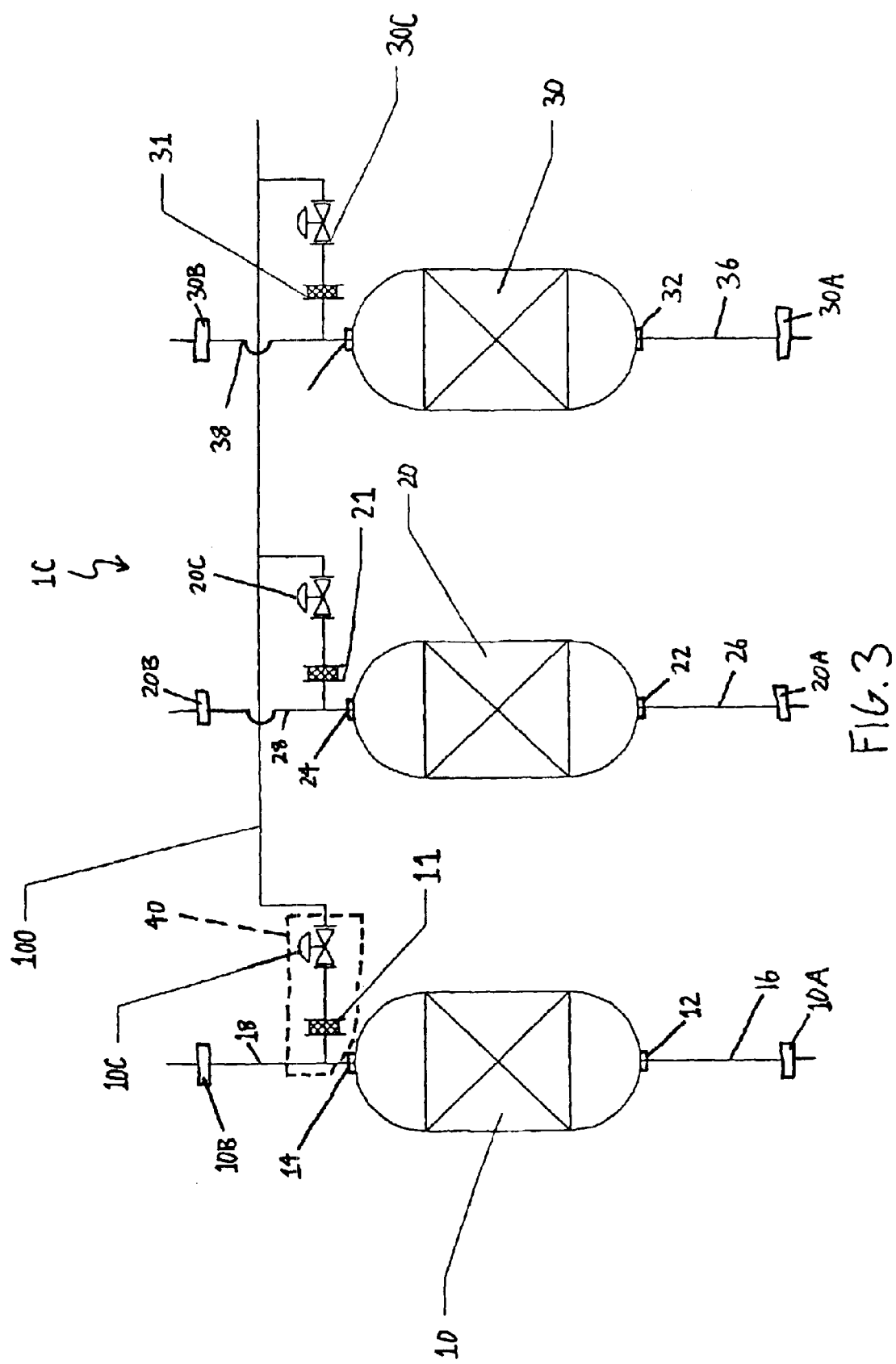
FIG. 3 is a schematic view of a treatment assembly including flow restricting components, in accordance with another embodiment of the present invention.

FIG. 3 illustrates the vessels of FIG. 2 with flow restricting components 11, 21, and 31 (hereinafter referred to as flow restrictors). Each flow restrictor 11, 21, and 31 has a linear relationship between flow rate and pressure differential or, alternatively, a predetermined non-linear relationship between flow rate and pressure differential. Most valves, in contrast to the described flow restrictors, are inherently non-linear (e.g., providing Bernoulli flow). When the purge step previously described is executed using these flow restrictors, a number of advantages may be realized. First, the number of valve pulses required to achieve a desired flow profile may be advantageously reduced, as the highly nonlinear flow condition of a normal metering valve is avoided. This extends the valve seal lifetime, and allows more rapid PSA cycles to be executed for a given valve response time if valve response time during the pulsing is a limiting factor. Proper selection of the flow restricting elements can completely eliminate the need for valve pulsing while still providing the improved pressure and flow control of the present invention.

An example of an element having a linear relationship between differential pressure and flow rate is a porous flow element, e.g., made using sintered metal fibers or powders. Each of flow restrictors 11, 21, and 31 can be arranged as such a porous flow element. Porous bodies made of other materials such as paper, ceramic, or polymer may also be advantageously employed. A particularly preferred porous flow restrictor material is made from sintered metal powder, for instance, as supplied by the Mott Corporation.

FIG. 3 shows a treatment assembly 1C including flow restrictors 11, 21, and 31 mounted between vessels 10, 20, and 30 and their attendant control valves 10C, 20C, and 30C. For example, flow restrictor 11 is mounted between vessel 10 and its associated control valve 10C. Flow restrictor 11 can alternately be located between control valve 10C and parallel manifold 100. In the system of FIG. 1, a flow restrictor can be located anywhere in manifold 100 connecting vessel 10 to vessel 20. In the arrangement of FIG. 3 where the vessels of treatment assembly 1C communicate via a parallel manifold 100, the flow between two vessels will pass through two flow restrictors. Thus, if vessel 10 provides purge gas to vessel 20, that gas will pass through flow restrictor 11 then flow restrictor 21. In a system similar to FIG. 1, only a single flow restrictor would be required. Alternatively to the example shown in FIG. 3, treatment assembly 1C can include more or less flow restrictors than the ones shown, and can include flow restrictors in any configuration to produce a desired flow cycle.

The amount of flow resistance provided by the flow restrictor can be selected using techniques apparent to one skilled in the art to ensure the appropriate rate of fluid flow during a given PSA cycle step. Depending upon the desired flow rate, the desired pulsing frequency, and the desired length of the PSA cycle step of interest, a wide variety of criteria may be developed.

FIG. 4 is a section view of manifold assembly 40, which includes flow restrictor 11, valve 10C and a portion of conduit 18, which is connected to port 14. Manifold assembly 40 can be arranged as the PSA flow manifold described in U.S. patent application Ser. No. 10/269,067, issued as U.S. Pat. No. 6,755,895, which is hereby incorporated by reference in its entirety. Manifold assembly 40 includes a portion of fluid manifold 100 in fluid connection with a valve chamber 42, which mounts valve 10C, which is arranged as a piston valve and includes a stem 44 and a sealing surface 41. Stem 44 is arranged to travel linearly along a bore 45. Valve 10C is shown in the open position, where seal surface 41 is withdrawn from sealing contact with a valve seat 46. Interposed between valve seat 46 and fluid conduit 18 (which communicates with vessel 10) is porous flow restrictor 11. Flow restrictor 11 is held in place by a retaining ring 48 against a shoulder 43. Retaining ring 48 may be secured by threads, adhesive, a press fit, or any other means apparent to one skilled in the art. Alternatively, retaining ring 48 may be arranged as a snap ring. Preferably, retaining ring 48 allows the porous flow restrictor 11 to be removed for inspection or replacement.

Flow restrictor 11 and retaining ring 48 are situated so that piston valve 10C may freely actuate, moving sealing surface 41 into and out of sealing contact with seat 46. Flow between fluid manifold 100 and conduit 18 is restricted by flow restrictor 11 subsequent to the above-described method. If any adsorbent fines or other particles are entrained in the flow, they will be deposited on the surface of flow restrictor 11. When flow is reversed through flow restrictor 11 during the PSA cycle, any deposited particles will be ejected from the face of flow restrictor 11 by fluid pressure. Thus, flow restrictor 11 is highly-resistant to clogging by particles. Likewise, should condensate form on the surface of flow restrictor 11, it would be purged in the subsequent counterflow step.

It should be noted that any desired number of PSA vessels may be connected to fluid manifold 100 of FIG. 4. Each vessel would have its own associated flow conduit 18 and its own combination of a valve, a seat, and a flow restrictor. The resulting apparatus may then be advantageously used to implement any PSA cycle between two or more adsorbent vessels that involves a cycle step which would benefit from the flow control feature of the present invention. An important example of such a PSA cycle step is the provision of purge gas from one vessel to another.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for reducing shock during a flow of fluid between a first vessel and a second vessel, the method comprising the steps of:

providing a conduit between the first vessel and the second vessel; and minimizing a rate of pressure change within the second vessel caused by the flow of fluid along the conduit from the first vessel, wherein the minimizing step includes controlling a rate of flow of fluid between the first vessel and the second vessel over a predetermined duration.

2. The method according to claim 1, wherein the step of controlling the rate of flow includes the steps of:

providing a valve in the conduit; and controlling the valve to create a pulsed opening and closing of the valve to obtain a predetermined flow rate profile over the predetermined duration.

3. The method according to claim 1, wherein the step of controlling the rate of flow includes the step of providing a flow restrictor in the conduit to obtain a predetermined flow rate profile over the predetermined duration.

4. A method for controlling a flow of a gas, comprising the steps of:

directing the gas from a first vessel to a second vessel; and obtaining a predetermined flow rate profile in the flow between the first and second vessels, wherein the obtaining step includes introducing a first pulse into the flow by opening and closing a first valve in an alternating manner.

5. The method of claim 4, wherein the first valve is a piston valve.

6. The method of claim 4, wherein the obtaining step further includes positioning a first porous flow control component between the first and second vessels such that a combination of the first pulse and of a flow restricting effect of the porous flow control component achieves the predetermined flow rate profile.

7. The method of claim 6, wherein the first porous flow control component exhibits a linear relationship between flow rate and pressure differential.

8. The method of claim 6, wherein the first porous flow control component is made from sintered metal powder.

9. The method of claim 4, further comprising the step of setting the predetermined flow rate profile to be a constant flow rate.

10. The method of claim 4, further comprising the step of setting the predetermined flow rate profile to be a chronologically-increasing flow rate.

11. The method of claim 4, further comprising the step of setting the predetermined flow rate profile to be a chronologically-decreasing flow rate.

12. The method of claim 4, wherein the predetermined flow rate profile is set such that a time period allotted to complete the directing step is entirely used to perform the directing step.

13. The method of claim 4, wherein the obtaining step includes introducing a second pulse into the fluid flow between the first vessel and the second vessel by opening and closing a second valve in an alternating manner, wherein a combination of the first and second pulses achieves the predetermined flow rate profile.

14. The method of claim 13, wherein the obtaining step further includes positioning a second porous flow control component between the first and second vessels wherein a combination of the first pulse, of the second pulse, and of a flow restricting effect of the second flow control component achieves the predetermined flow rate profile.

15. The method of claim 14, further comprising the step of opening and closing the first and second valves in an asynchronous manner.

16. The method of claim 14, further comprising the step of opening and closing the first and second valves in a synchronous manner.

17. A method for controlling a flow of a gas, comprising the steps of:
directing the gas from a first vessel to a second vessel; and
obtaining a predetermined flow rate profile in the flow between the first and second vessels,
wherein the obtaining step includes providing a flow restrictor in the flow between the first and second vessels, the flow restrictor exhibiting a linear relationship between flow rate and pressure differential.

18. The method of claim 17, wherein the obtaining step further includes introducing a first pulse into the flow by opening and closing a first valve in an alternating manner such that a combination of the first pulse and of a flow restricting effect of the flow restrictor achieves the predetermined flow rate profile.

19. The method of claim 18, wherein the first valve is a piston valve.

20. The method of claim 18, wherein the obtaining step includes introducing a second pulse into the fluid flow between the first vessel and the second vessel by opening and closing a second valve in an alternating manner, wherein a combination of the first pulse, the second pulse, and a flow restricting effect of the flow restrictor achieves the predetermined flow rate profile.

21. The method of claim 20, further comprising the step of opening and closing the first and second valves in an asynchronous manner.

22. The method of claim 20, further comprising the step of opening and closing the first and second valves in a synchronous manner.

23. The method of claim 17, wherein the flow restrictor is porous.

24. The method of claim 23, wherein the flow restrictor is made from sintered metal powder.

25. The method of claim 17, further comprising the step of setting the predetermined flow rate profile to be a constant flow rate.

26. The method of claim 17, further comprising the step of setting the predetermined flow rate profile to be a chronologically-increasing flow rate.

27. The method of claim 17, further comprising the step of setting the predetermined flow rate profile to be a chronologically-decreasing flow rate.

28. The method of claim 17, wherein the predetermined flow rate profile is set such that a time period allotted to complete the directing step is entirely used to perform the directing step.

29. The method of claim 17, wherein the obtaining step further includes positioning a second flow restrictor between the first and second vessels wherein a combination of the flow restricting effects of the flow restrictor and the second flow restrictor achieves the predetermined flow rate profile.

30. A gas treatment assembly, comprising:
first and second vessels each including gas treatment material;
a manifold connecting the first and second vessels to provide communication of a gas between the first and second vessels; and
a first manifold assembly provided between the first vessel and the manifold, the manifold assembly including:
a first piston valve, and
a first porous flow restrictor.

31. The assembly of claim 30, wherein the flow restrictor exhibits a linear relationship between flow rate and pressure differential.

32. The assembly of claim 30, wherein the flow restrictor is made from sintered metal powder.

33. The assembly of claim 30, further comprising a second manifold assembly provided between the second vessel and the manifold, the manifold assembly including a second piston valve.

34. The assembly of claim 33, wherein the second manifold assembly includes a second porous flow restrictor.

35. The assembly of claim 30, wherein the gas treatment material is adsorbent material.

36. A gas treatment assembly, comprising:
first and second vessels;
a manifold connecting the first and second vessels to provide communication of a gas between the first and second vessels; and
first means for minimizing a rate of pressure change within the second vessel caused by a gas flow along the manifold from the first vessel,
wherein the first minimizing means controls a rate of gas flow between the first vessel and the second vessel over a predetermined duration.

37. The assembly of claim 36, wherein the first minimizing means controls the rate of gas flow to obtain a predetermined flow rate profile over the predetermined duration.

38. The assembly of claim 37, wherein the predetermined flow rate profile is set to be a constant flow rate.

39. The assembly of claim 37, wherein the predetermined flow rate profile is set to be a chronologically-increasing flow rate.

40. The assembly of claim 37, wherein the predetermined flow rate profile is set to be a chronologically-decreasing flow rate.

41. The assembly of claim 36, wherein the first minimizing means controls the rate of gas flow by introducing a first pulse into the gas flow.

42. The assembly of claim 41, further comprising a second means for minimizing the rate of pressure change within the second vessel caused by the gas flow, wherein the second minimizing means controls the rate of gas flow by introducing a second pulse into the gas flow.

43. The assembly of claim 36, wherein the first minimizing means controls the rate of gas flow by restricting the flow in accordance to a linear relationship between flow rate and pressure differential.

44. The assembly of claim 36, wherein the first minimizing means controls the rate of gas flow such that an internal pressure of the first vessel is maintained at a higher level than an internal pressure of the second vessel.

* * * * *